Patented Oct. 30, 1945

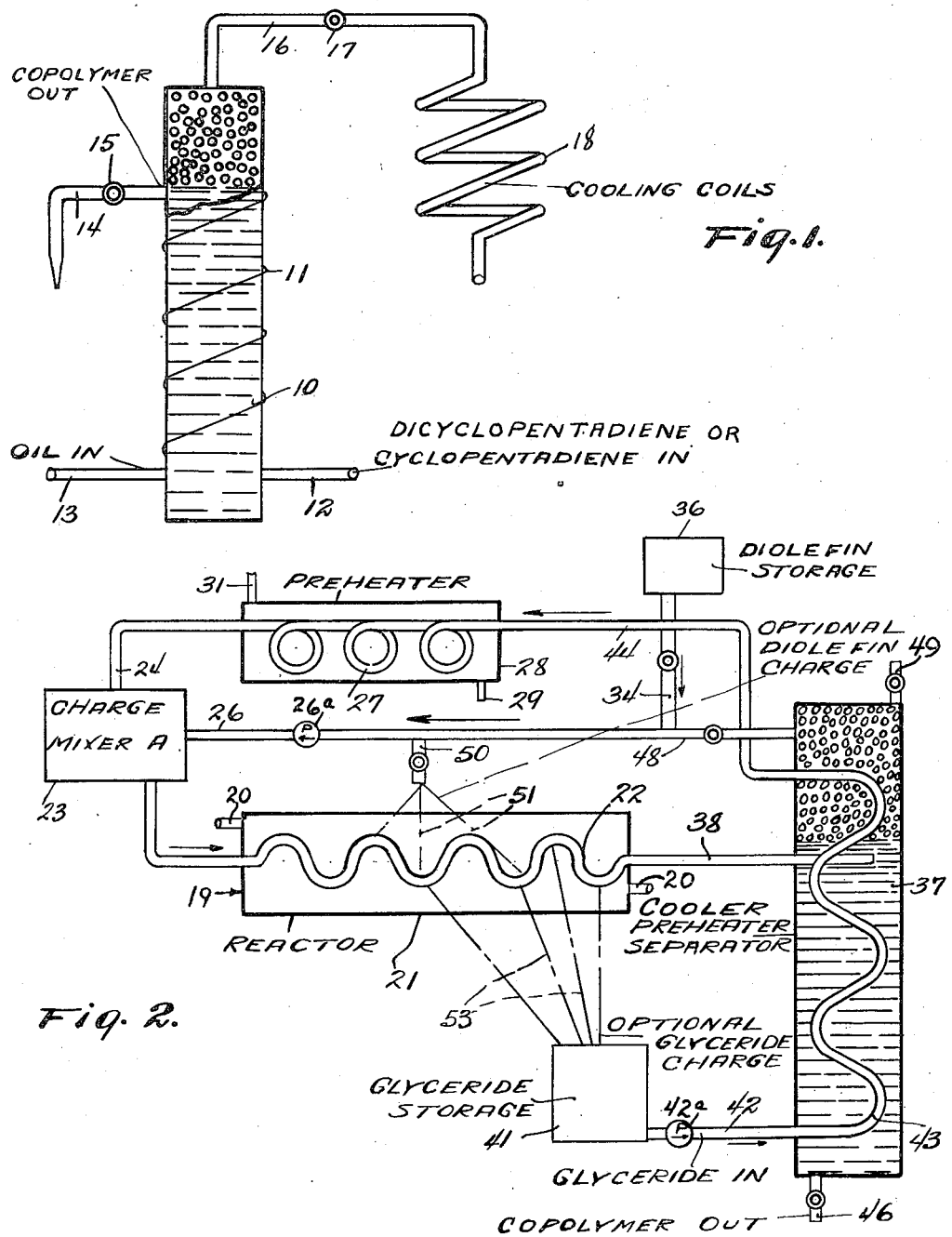

2,387,895

UNITED STATES PATENT OFFICE 2,387,895

PREPARATION OF DIOLEFINIC RESINS

Howard L. Gerhart, Milwaukee, Wis., assignor to Pittsburgh Plate Glass Company, Allegheny County, Pa., a corporation of Pennsylvania Application December 3, 1943, Serial No. 512,769

5 Claims. (Cl. 260—23)

The present invention relates to the polymerization of unsaturated hydrocarbons to form resinous bodies and it has particular relation to methods of and apparatus for effecting such polymerization under simultaneous application of heat and pressure.

One object of the invention is to provide a process of an apparatus for polymerizing diene hydrocarbons as a continuous operation.

A second object is to provide a process in which excess volatile reactants are recovered and recycled.

A third object is to provide a process in which the polymerization can be quickly and accurately terminated at precisely the right point after a desired degree of resinification has been reached.

A fourth object is to provide a process in which the amount of reactants undergoing heat treatment at any particular time is small that the hazards of uncontrolled reaction or of explosions are minimized or eliminated.

A fifth object is to provide a process of preparing a resinous body involving the use of a relatively difficultly polymerizable dicyclopentadiene or cyclopentadiene polymers containing 3 to 5 $C_5H_6$ units as a starting ingredient.

These and other objects of the invention will be apparent from consideration of the following specification and the appended claims.

It has heretofore been proposed to prepare polymeric resinous bodies by subjecting a cyclic diolefin, such as cyclopentadiene to catalytic addition of molecules. The products were powdery, relatively insoluble and exhibited a strong capacity for absorbing atmospheric oxygen when exposed to the latter. These polymers, because of these characteristics, have not, heretofore, been satisfactory for actual commercial usage.

Conventional methods of preparing the polymers involve batch operations which, if employed on a large scale, necessitate the treatment of large amounts of materials in closed containers. Under such conditions efficient cooling is difficult and uncontrolled rise of temperature is likely to occur. Furthermore, in such method, it is very difficult and often impossible to control the degree of polymerization of the material with sufficient accuracy, because the large bodies of completely or partially polymerized material can not be cooled sufficiently to stop the reaction in a short period of time. Therefore it was necessary to discontinue heating at a time considerably short of the desired degree of polymerization and then trust to luck that precisely the right degree of polymerization will be attained by the time the material had cooled below the reaction temperature.

It will of course be apparent that with large volumes of highly combustible materials such as cyclopentadiene the explosion hazards are also quite considerable. The common source of the cyclopentadiene is from dicyclopentadiene from which it is obtained by cracking. This of course is expensive, and also entails considerable loss of material.

In accordance with the provisions of the present invention it is proposed to obviate the foregoing difficulties by subjecting dicyclopentadiene alone or in admixture with other materials, such as drying oils, indene, coumarone, to elevated temperature and pressure to form polymers of exceptional value.

As a further feature the invention contemplates the provision of an apparatus for polymerizing dicyclopentadiene or the like, in which the reactants are caused to flow as a continuous stream through a reaction zone where they are caused quickly to react and are then removed.

For a better understanding of the invention reference may now be had to the accompanying drawing in which Figs. 1 and 2 are diagrammatical views illustrating suitable embodiments of apparatus for use in the practice of the invention.

In the drawing like numerals refer to like parts throughout.

The form of the invention as shown in Fig. 1 comprises a column or tower 10 formed of stainless steel, or other strong, chemically non-reactive, material so fabricated as to be capable of withstanding substantial pressures, e. g., pressures within a range of about 60 to 120 pounds or more per square inch. The column is provided with suitable heating means, such as a heating coil 11 by means of which the reactants in it may be brought to an appropriate temperature in operation, i. e., about 600° to 700° F. At these temperatures polymerization catalysts are not required. In the reaction there may be employed a polymerizable cyclic diolefin, i. e., cyclopentadiene or preferably dicyclopentadiene, or other lower polymer such as tricyclopentadiene, tetracyclopentadiene or pentacyclopentadiene containing from 3 to 5 $C_5H_6$ units per molecule. The recovery of the latter as a result of partial polymerization of dicyclopentadiene contained in an impure fraction of drip oil such as "Dripolene," coal tar or the like is disclosed in an application Serial No. 512,770, filed of even date, and entitled Purifying dicyclopentadiene, by Howard L. Gerhart and Leon M. Adams. These are fed into the column adjacent to the bottom thereof through a suitable inlet conduit 12. It may be polymerized alone, or it may be conjointly polymerized with an equimolar ratio of a glyceride oil or an ethylenic compound, such as indene, coumarone, methyl methacrylate, styrene maleic anhydride, or the like. In the latter case, the added material, e. g., a glyceride oil, such as linseed oil, soya bean oil, tung oil, whale oil, perilla oil or other oil preferably of a drying or semi-drying nature is fed into the column through a conduit 13 and flows upwardly conjointly with and in thorough admixture with the hydrocarbon introduced through the inlet 12. The ratio of oil to hydrocarbon may be approximately equi-molar, but may be substantially less, e. g. 25 percent molar. A two or three hundred percent excess of oil is also possible. The rate of flow is so adjusted that at the temperature of operation the ingredients will have approximately reached the desired degree of polymerization by the time they have traversed the reaction zone within the column. At the temperature of reaction a positive pressure of about 60 to 120 pounds per square inch will exist within the column.

The copolymer resin, approximately at a satisfactory stage of resinification, is drawn off at the top of the reaction zone through a conduit 14, which is provided with a valve 15, by means of which the degree of pressure and rate of flow of liquids may be adjusted within the column. The resinous product may be cooled as it is drawn off by means of suitable apparatus (not shown) within a period of time so short as substantially to inhibit further polymerization outside of the column. An excess of cyclopentadiene or dicyclopentadiene in the reaction zone may be desired, and this excess may be permitted to escape as a vapor or gas at the surface of the polymerized liquid and can then be drawn off through a conduit 16, having a regulatory valve 17. The vapors are chilled and may be condensed in a suitable cooler coil 18. The recovered diolefin can be recycled or, if preferred, can be applied to other purposes.

The resin at least while hot is liquid. It may be cooled and admixed with additional drying oils, thinners, pigments and the like to obtain a paint of desired viscosity and color. It may, also, be further cooked or heat treated in order to obtain a desired degree of bodying.

It will be apparent that the apparatus as herein described is of simple nature and is susceptible of continuous operations in such manner as to obtain large production with relatively small amounts of apparatus. The resultant resins are relatively soluble in paint and varnish solvents. They also are compatible with other resins and may be admixed with the latter in large amounts to provide short oil compositions capable of combining with pigments as coloring matter to provide excellent paint and varnishes. Where dicyclopentadiene is employed as a source of cyclic diene hydrocarbon the necessity of subjecting the latter to a cracking operation is avoided. It will be apparent that the dicyclopentadiene may be employed in substantially pure form. A commercial distillate fraction containing 30 percent or more of other hydrocarbons, which either undergo polymerization or else are permitted to escape as vapors from the reaction zone, may, also, be used.

In the form of the invention illustrated in Figure 2 a reactor 19 may comprise an outer shell 21, conduits 20 for a heating medium, such as an inert, relatively, non-volatile oil, mercury or the like. The reactants are carried through the heater shell in a tubular coil 22, which may be of inert material, such as stainless steel or the like. The charge is introduced into the coil 22 from a mixer 23, having inlets 24 and 26 respectively for the glyceride oil component and the diolefin component. The glyceride oil may be preheated, almost to the reaction temperature, before it is introduced into the mixer, in a coil 27, which is disposed within a heater jacket 28 having an inlet 29 and an outlet 31 for heating medium.

The time and temperature of heating in reactor coil 22 will depend upon:
1. The nature of the charge.
2. The time and temperature of preheating.
3. The viscosity of the oil.

Where the glyceride oil in the charge is a highly reactive oil, such as tung oil, the rate of reaction with the diolefin is relatively faster than where the oil is less reactive, such as soya oil. Long preheating has the effect of increasing the viscosity of the charge and greatly shortens the length of time required in the reactor. Using a typical charge such as 60 parts alkali refined embodied linseed oil and 40 parts dicyclopentadiene, the conditions for the reaction without preheating are about 3 hours at 270–290° C. at a pressure which gradually decreases from 100 to 25 lbs. per sq. inch. When the charge is preheated for 2 hours at 200° C. the reaction time is reduced in half.

Under the preferred method of operating by the continuous process, it is desirable that the liquid flow through reactor 22 and out of exit tube 46 as rapidly as possible. The temperature of the reactants in coil 22 may be increased to any convenient point, say 350–400° C. so as to complete the copolymerization in the shortest convenient time.

The conduit 26 with a pump 26a for the diolefin is connected by a branch 34 to a suitable container 36 for it. The conduit 26 is also connected to the upper portion of a column 37 that may function as a cooler for polymer, preheater for reactants, and, also, as a separator for unpolymerized diolefin. To this end, it is connected by conduit 38 to the reactor coil 22 to receive the freshly formed polymer. Preferably the discharge extremity of the conduit 38 is so constricted as to assure a substantial difference of pressure between the interior of the column 37 and the coil 22.

The glyceride oil contained in storage in tank 41 is carried by conduit 42, having pump 42a, to the lower extremity of coil 43, which is contained within the column 37 and is there warmed by heat from the freshly formed polymer, and in so doing cools the latter. The warm glyceride oil is conducted by line 44 to the preheater for further heating. The copolymer resin is discharged from the bottom of the column 37 through conduit 46 while any unreacted, gaseous components escape upwardly as bubbles and are conveyed over through conduit 48, which, as shown in the drawing, discharges into the mixture 23. If preferred, unreacted gases may also be drawn off at the top of the column through conduit 49.

In the drawing is shown a branch 50 for hydrocarbons, upon the conduit 26, which branch may optionally be connected by conduits indicated by broken lines at any preselected point to the coil 22. Possible points of connection are indicated at 51. Similarly optional feed conduits may be connected from oil container 41 to the coils by means of conduits indicated as broken lines at 53. In this manner it is possible to feed cool reactants into the reactor at any point in such manner as to admit of exact control of the temperature of the reacting ingredients.

The reactants flow through the reaction zone as a continuous stream, the total volume of which, at any one time, is small. Fire hazards are thus reduced. It is, also, assured that each portion of the reactants is subjected to the desired conditions. The reaction is initiated and stopped at a predetermined point, so that highly uniform products are obtained. If it should be desired to adjust or change conditions in the system, this can be accomplished with a minimum time lag before equilibrium of the system is reached.

The charge can be varied over wide limits. The copolymer which is most useful as a varnish type product will contain from 30 to 70% oil and 40 to 30% polycyclopentadiene. Copolymers which contain less than 30% oil are inclined to be brittle and are of the nature of varnish type gums. Copolymers which contain greater than 70% oil are very flexible and tend to be of the nature of synthetic oils. A useful copolymer as prepared from 90% linseed oil, 10% dicyclopentadiene by this process dries rapidly and may be considered to be a synthetic substitute for China-wood oil for many applications.

The following compositions are illustrative of the charges which can be used:

Example I

| | Parts |
|---|---|
| Unbodied alkali refined linseed oil | 6 |
| Dicyclopentadiene | 4 |

Example II

| | Parts |
|---|---|
| Unbodied alkali refined soya oil | 34 |
| Dicyclopentadiene | 45 |

Example III

| | Part |
|---|---|
| Alkali refined medium bodied linseed oil | 1 |
| Cyclopentadiene | 1 |

Example IV

| | Parts |
|---|---|
| Alkali refined unbodied linseed oil | 6 |
| Trimer or tetramer of cyclopentadiene | 4 |

Example V

| | Parts |
|---|---|
| Alkali refined unbodied soya oil | 9 |
| Dicyclopentadiene | 1 |

The copolymer from this composition is a synthetic oil which dries as rapidly as alkali refined linseed oil.

Example VI

| | Parts |
|---|---|
| Tung oil | 10 |
| Linseed oil | 3 |
| Dicyclopentadiene | 1 |

Example VII

| | Part |
|---|---|
| Tung oil | 1 |
| Dicyclopentadiene | 1 |

The temperature of reaction should be above 200° C. and below that of charring or decomposition of the reactants of the product. A range of about 230 to 450° C. may be employed dependent upon the time permissible in the tube. The higher the rate of feed the higher may be the temperature. The time in the reactor tube may be controlled with exactness, merely by varying the rate of feed. The rate of feed for any given apparatus and under any given conditions can be determined by measurement of the viscosity of the product. For most purposes, a product of a viscosity of about "E" on the Gardner-Holdt scale is satisfactory, when the finished resin is dissolved in petroleum naphtha to give a 50% solution by weight.

This invention is not to be limited by any explanation of the process by which copolymerization takes place. It is assumed that reaction takes place between monomeric cyclopentadiene and the unsaturated valences in the glyceride oils. Since dicyclopentadiene decomposes on treating at about 170° C. into cyclopentadiene it is immaterial whether the charge in mixer A contains the monomer or the dimer of cyclopentadiene. In a copending application it is demonstrated that the charge may also contain trimer, tetramer or even higher polymeric forms of cyclopentadiene. A charge of this nature is also contemplated for the continuous process. Essentially the same conditions of operation apply whether the diolefin in the charge be monomer, dimer, trimer or tetramer.

Example VIII

A copolymer was prepared from the relatively purified trimer-tetramer mixture having the distillation range 97° C. to 190° C. at 4 mm. pressure. 320 parts of this mixture and 480 parts alkali refined linseed oil was fed continuously through the reactor tube. The temperature was within a range of about 275 to 450° C.

The advantage in using the relatively purified trimer and tetramer is that the color of the copolymer is lighter. The glyceride oil copolymers so prepared are equal in every respect to copolymers prepared from dicyclopentadiene and it is intended that methods and products described in copending applications using dicyclopentadiene shall be equivalent when the trimer-tetramer-pentamer mixture is used in place of the dimer.

It is possible that some cyclopentadiene may react with the olefinic diluting impurities under the conditions by which the slush is formed. If such reaction products accumulate in the solid phase of the slush and are charged with oil to prepare the copolymer no harm will result. In fact, many such secondary reaction products are useful in the preparation of these copolymers as described in my copending application Serial No. 470,093, filed December 24, 1942, and entitled Modified cyclopentadiene-glyceride copolymers.

A charge containing relatively large amounts of tung oil requires less time and lower temperatures than a charge containing soya or linseed oils. When the ratio of tung oil to dicyclo is greater than 1 to 1, there is danger of forming an insoluble gel. This danger is not as apparent when there is present some oil such as linseed or soya oil in which case the ratio of tung oil to dicyclo may be raised at will. Oils may be raw, bodied, blown, refined, dehydrated, etc.; in general, all natural or treated glycerides are useful. Oil acids or partially hydrolyzed oils are also useful. The reaction time must be predetermined and is governed by the rate of bodying of the oil and the body desired in the finished resin.

The continuous process has the advantage of a one-step process and produces a resin having good light stability, toughness, light color on baking, and short drying time. The resins are soluble in the common cheaper hydrocarbon thinners, are well adapted as varnishes or as enamel vehicles, and can be applied in the same manner as existing varnishes. They are responsive to the addition of driers in the same manner as a varnish.

Useful pigmented compositions are made as shown by the following examples:

| | Resin composition | Heating schedule | Pigment composition |
|---|---|---|---|
| A | 1300 cc. tung oil<br>500 cc. bodied soyal oil<br>1000 cc. dicyclopentadiene | 2 hr./245° C. | Calcium base.<br>Titanium oxide. |

(These two enamels dry to give tough white coatings having good light stability.)

| | Resin composition | Heating schedule | Pigment composition |
|---|---|---|---|
| B | 1000 cc. tung oil<br>300 cc. linseed oil<br>1000 cc. dicyclopentadiene | 2.5 hr./250° C. | 1 part antimony oxide.<br>1 part Titanox C.<br>½ part carbon black. |

This gray enamel can be used for both air-drying and baking types of finishes. The use of these resins is not limited to any particular type of pigment. The resins can be used as vehicles for aluminum, zinc containing pigments, gilsonite, lithopone, etc. Driers may be added either to the charge and be processed with the resin or may be incorporated with the finished vehicle or enamel paste. Certain metallic soaps such as cobalt, nickel, zinc or copper naphthenates, or the salts of the acids derived from natural glycerides are useful as addenda to the charge to increase the body of the resin. These salts then act as driers when the films are subjected to drying conditions.

When pure dicyclopentadiene is the only hydrocarbon in the charge, the resin will usually be a semi-plastic mass which must be thinned for use. This is preferably done while the resin is hot. Any hydrocarbon thinner is useful for this purpose. The charge may contain diluting materials which are normally present in commercial dicyclopentadiene such as indene and coumarone, which are useful modifying agents for resins of this class. The most useful resins are formed, however, when at least 50 per cent of the hydrocarbon charge contains dicyclopentadiene. Other non-resinifying diluents are permissible or these may be added during any stage of the resinification reaction to reduce the viscosity.

The use of heat and pressure polymerization, as herein disclosed, obviates the necessity of employing catalysts and of course the necessity of neutralizing or eliminating the catalyst residue is avoided. The reaction is moderate in rate and is not excessively exothermic, so that it can be controlled with comparative ease and with but little fire hazard. Escape of disagreeably odorous hydrocarbon vapors is also avoided.

The polymerization can be conducted upon crude fractions of the hydrocarbon component, because under heat and pressure even some of the impurities react and need not be removed from the final product.

Enamels can be prepared from the resins herein disclosed, which have good drying rates even under air drying conditions, and the products are staple, hard, clear and of excellent gloss. They are also relatively free from a tendency to wrinkle.

The forms of the invention herein described are to be considered merely as exemplary. It will be apparent to those skilled in the art that numerous modifications may be made therein without departure from the spirit of the invention or the scope of the appended claims.

The present case is a continuation in part of my copending application, Serial No. 324,392, filed March 16, 1940, and entitled Resinous material.

What I claim is:

1. A process of preparing a synthetic resin which comprises continuously flowing a mixture of dicyclopentadiene and an unsaturated glyceride oil under a pressure of about 60 to 120 pounds per square inch through a zone heated to a range of approximately 200 to 450° C. until a conjoint polymerization product in liquid state is obtained and simultaneously continuously withdrawing the polymerization product.

2. A process of preparing a synthetic resin which comprises continuously flowing a mixture of a diene hydrocarbon consisting of from 1 to 5 cyclic $C_5H_6$ units per molecule and an unsaturated glyceride oil at a pressure of approximately from 60 to 120 pounds per square inch continuously through a tube heated to obtain a temperature of approximately 200 to 450° C. until a liquid conjoint polymer is obtained.

3. A process of preparing a resin which comprises substantially continuously flowing under pressure a cyclic diene hydrocarbon of the formula $(C_5H_6)_x$ where $x$ is a whole number from one to five in admixture with an unsaturated glyceride oil through an elongated tube heated to a temperature of about 600° to 700° F. to effect conjoint polymerization of the hydrocarbon and the oil.

4. A process of preparing a synthetic resin which comprises continuously flowing a mixture of dicyclopentadiene, and an unsaturated glyceride oil under pressure of not substantially less than 60 lbs. per square inch through a zone where it is heated to a temperature of approximately 200° to 450° C. until a conjoint polymerization product in liquid state is obtained and substantially continuously withdrawing the polymerization product.

5. A process of preparing a synthetic resin which comprises continuously flowing a mixture of diene hydrocarbon consisting of from one to five cyclic $C_5H_6$ units per molecule and an unsaturated glyceride oil at a pressure of not substantially less than 60 lbs. per square inch substantially continuously through a tube heated to obtain a temperature of approximately 200° to 450° C. until a liquid conjoint polymer is obtained.

HOWARD L. GERHART.